United States Patent
Earl et al.

(10) Patent No.: US 11,888,587 B2
(45) Date of Patent: Jan. 30, 2024

(54) TOLERANT PCS FOR ACCURATE TIMESTAMPING IN DISAGGREGATED NETWORK ELEMENTS AND SYNCHRONIZATION METHOD

(71) Applicant: Ciena Corporation, Hanover, MD (US)

(72) Inventors: John Andrew Earl, Ottawa (CA); David James Evans, Ottawa (CA); David Stuart, Ottawa (CA); Daniel Claude Perras, Ottawa (CA)

(73) Assignee: Ciena Corporation, Hanover, MD (US)

( * ) Notice: Subject to any disclaimer, the term of this patent is extended or adjusted under 35 U.S.C. 154(b) by 18 days.

(21) Appl. No.: 17/376,232

(22) Filed: Jul. 15, 2021

(65) Prior Publication Data

US 2023/0029041 A1    Jan. 26, 2023

(51) Int. Cl.
*H04J 3/06* (2006.01)
*H04W 92/04* (2009.01)

(52) U.S. Cl.
CPC ............ *H04J 3/0667* (2013.01); *H04J 3/067* (2013.01); *H04J 3/0655* (2013.01); *H04J 3/0673* (2013.01); *H04W 92/04* (2013.01)

(58) Field of Classification Search
CPC .. H03M 13/27; H03M 13/2903; H04J 3/0655; H04J 3/0667; H04J 3/067; H04J 3/0673; H04L 49/351; H04W 92/04
See application file for complete search history.

(56) References Cited

U.S. PATENT DOCUMENTS

| | | | |
|---|---|---|---|
| 8,848,533 B1 | 9/2014 | Stuart et al. | |
| 9,722,739 B2 * | 8/2017 | Chapman | H04L 47/12 |
| 10,313,103 B1 * | 6/2019 | Perras | H04B 10/516 |
| 10,396,972 B1 | 8/2019 | Gareau et al. | |
| 10,425,177 B2 | 9/2019 | Gareau et al. | |
| 10,868,662 B2 | 12/2020 | Gareau et al. | |
| 2005/0099968 A1 * | 5/2005 | Yamano | H04W 52/58 |
| | | | 370/311 |
| 2019/0044637 A1 * | 2/2019 | Gulstone | H04J 3/067 |
| 2019/0327188 A1 | 10/2019 | Rivaud et al. | |
| 2020/0177361 A1 * | 6/2020 | Gareau | H04L 7/0331 |
| 2020/0396050 A1 | 12/2020 | Perras et al. | |

OTHER PUBLICATIONS

Imlau, "High accuracy time transfer performance, 1ns class, measurement results," Study Group: 15, Working Party: 3, Intended type of document (R-C-D-TD): CD13-11, Source: Deutsche Telekom, Feb. 2021, pp. 1-6.

* cited by examiner

*Primary Examiner* — Alpus Hsu
(74) *Attorney, Agent, or Firm* — Baratta Law PLLC; Lawrence A. Baratta, Jr.

(57) ABSTRACT

A network element includes a port; and a device with circuitry configured to encode data for communication to a second device via a plurality of physical channels, and utilize one of the plurality of physical channels as a dedicated timing channel with encoding thereon different from encoding on the other plurality of physical channels, and interface encoded data via the plurality of physical channels with the port for transmission and reception with a second device.

15 Claims, 7 Drawing Sheets

TOLERANT PCS FOR ACCURATE TIMESTAMPING IN DISAGGREGATED NETWORK ELEMENTS AND SYNCHRONIZATION METHOD

FIELD OF THE DISCLOSURE

The present disclosure generally relates to networking equipment hardware. More particularly, the present disclosure relates to systems and methods for a tolerant Physical Coding Sublayer (PCS) for accurate timestamping in disaggregated network elements and synchronization.

BACKGROUND OF THE DISCLOSURE

Networks, such as packet and optical networks, are physically implemented by network elements that can include, e.g., shelves, chassis, rack-mounted units ("pizza boxes"), and the like. Conventionally, network elements use a backplane for communication between modules, cards, plugs, blades, etc. (herein collectively referred to as modules). With a backplane, there is a known delay between each module and conventional timestamping techniques such as Precision Time Protocol (PTP), IEEE 1588-2002, 1588-2008, and 1588-2019, the contents of which are incorporated by reference herein. PTP provides a technique to distribute timing synchronization over standard Ethernet (1/10/25GE/100GE/ etc. (GE is Gigabit Ethernet)) and is widely adopted. Event messages are precisely timestamped to provide a roundtrip delay, which is assumed to be symmetrical to infer the one-way delay required to achieve synchronization. PTP assumes that a link has equal delay in both directions in order to determine the offset of a master and slave clock, and this assumption is fine with backplane-based network elements.

A distributed, disaggregated network element is one where modules interconnect to one another via cables (optical and/or electrical), instead of a backplane. FIG. 1 is a diagram of an example distributed, disaggregated network element 10. In this example, the network element 10 includes line modules 12, switch modules 14 that are in a chassis, and carriers 16. The line modules 12 can connect via cables to connectors 18 on the rear of the network element 10. An example disaggregated network element is described in U.S. patent application Ser. No. 15/959,746, filed Apr. 23, 2018, and entitled "Modular network element architecture," the contents of which are incorporated by reference. Those skilled in the art will recognize this is an example of a distributed, disaggregated network element; other embodiments are contemplated. The key aspect if the distributed, disaggregated network element is there can be delay asymmetry between a receive and transmit direction, i.e., this is not predictable as with a backplane. One possible source of delay asymmetry is the transceiver used to serialize/deserialize the data stream (delay of the receiver is not equal to the delay of the transmitter), as well as the logic required to encode/decode the Forward Error Correction (FEC)/PCS.

To achieve high accuracy, it is necessary to compensate for any known delay asymmetry. To cancel out these asymmetries, a typical approach is to move the timestamp reference plane to a common point outside of these known asymmetries, such as at the physical pin of the device. For example, when determining a timestamp that represents the time at which a packet was sent, the initial timestamp may represent the time at which the packet was sent to the FEC encoder. If the exact delay of the encoder and the transceiver is known, the timestamp can then be corrected to represent the time at which the start of the packet will be at the physical pin of the device. In the receive direction, a start of packet is received, and a timestamp is taken that would represent the time at which it was seen after the FEC decoder. It must then be corrected to represent the time at which the packet was received at the physical pin. These two corrections together ensure that any delay asymmetry introduced by transceivers and PCS logic is removed.

The complexity of the PHY logic when using a link that requires FEC makes the process of determining when a particular bit was or will be on the physical pin much more difficult. This is potentially due to a few things, such as transcoding of 66b blocks (which include start of packet characters) to larger FEC codewords, serialized data word width may differ from encoded data word width, elastic stores (implementation specific, but typical), and the like. In theory, achieving a high level of accuracy with standard 25GE encoded with KP4 FEC should be possible; however, the implementation would have to be built from the ground up to ensure this, and would likely be very difficult and resource intensive to achieve.

Conventional Field Programmable Gate Array (FPGA) solutions for PTP over 25GE require significant resources for the 25GE Media Access Control (MAC), PCS, FEC and timestamping functions and packet processing and are also very inaccurate (e.g., 6-10 ns). This solution could in theory operate with higher accuracy, however the complexity required to track the timing delays through the many processing layers is significant. Application Specific Integrated Circuit (ASIC) solutions require an Layer 2 (L2) switch or a Network Interface Card (NIC) to provide the 25GE port—both of which are expensive and may require additional software. ASIC solutions are especially expensive in a system which otherwise has no need for an L2 switch or a CPU with PCIe to host the NIC. Furthermore, ASIC solutions typically provide time synchronization accuracy of only ~2 ns. The key takeaway is that the definition and implementation of the Ethernet physical layer can be a hinderance to providing the highest level of accuracy.

Solutions that require a known one-way delay introduce significant error uncertainty when cables of non-deterministic length are used to connect entities that require synchronization, such as in the distributed, disaggregated network element.

BRIEF SUMMARY OF THE DISCLOSURE

The present disclosure relates to systems and methods for a tolerant Physical Coding Sublayer (PCS) for accurate timestamping in disaggregated network elements and synchronization. In an embodiment, the present disclosure includes a dedicated PCS channel for timing distribution, using techniques that prioritize accuracy, resolution, and resource utilization over bandwidth efficiency. This approach is low cost, high precision, and is compatible with existing hardware, using standard PTP over 25GE (or the like) to distribute timing in a distributed disaggregated network element. The allows the disaggregated chassis to distribute precisely phase aligned clocks throughout the system to ensure that all PTP/1588 enabled ports have similar performance. In another embodiment, the present disclosure includes a back-to-back Interworking Function (IWF) with standard PTP implementations, using a physical channel that is dedicated to highly accurate and efficient timing synchronization, rather than relying existing protocols, such as Ethernet, Optical Transport Network (OTN), Flexible Ethernet (FlexE), etc., which are not optimized for timing, and are expensive to implement.

In an embodiment, a network element includes a port; and a device with circuitry configured to encode data for communication to a second device via a plurality of physical channels, and utilize a dedicated timing channel with encoding thereon different from encoding on the other plurality of physical channels, and interface encoded data via the plurality of physical channels with the port for transmission and reception with the second device. The plurality of physical channels can be Ethernet Physical channels. The encoding on the dedicated timing channel can have a significantly lower throughput than the encoding on the other plurality of physical channels. The encoding on the dedicated timing channel can include encoding the data as a series of codes, replicating and interleaving the series of codes, and adding a header. The circuitry can be further configured to add timestamps to the encoded data on the dedicated timing channel. The network element can be a distributed, disaggregated network element, and the device and the second device are both included therein. The port can be on a pluggable optical module. The data on the dedicated timing channel can include Precision Time Protocol (PTP) messages.

In another embodiment, an interworking circuit includes a connection to a first Precision Time Protocol (PTP) clock; a connection to a second interworking circuit having a connection to second PTP clock via a dedicated timing channel; and circuitry configured to perform a three layer timestamp exchange including between a PTP application layer including the PTP clock, an interworking function to the dedicated timing channel, and the dedicated timing channel. The interworking function can be configured to use precise timestamps with the dedicated timing channel and to provide timestamps at the PTP application layer with the precise timestamps. The dedicated timing channel can be one of a plurality of physical channels with the dedicated timing channel with encoding thereon different from encoding on the other plurality of physical channels. The plurality of physical channels can be Ethernet Physical channels. The encoding on the dedicated timing channel can have a significantly lower rate than the encoding on the other plurality of physical channels. The encoding on the dedicated timing channel can include encoding the data as a series of codes, replicating and interleaving the series of codes, and adding a header. The interworking circuit can be in a distributed, disaggregated network element.

In a further embodiment, a method includes receiving data for transmission; encoding the data for communication to a device via a plurality of physical channels, utilizing one of the plurality of physical channels as a dedicated timing channel with encoding thereon different from encoding on the other plurality of physical channels; and transmitting the encoded data via the plurality of physical channels with a port communicatively coupled to the second device. The plurality of physical channels can be Ethernet Physical channels. The encoding on the dedicated timing channel can include encoding the data as a series of codes, replicating and interleaving the series of codes, and adding a header. The method can further include performing a three layer timestamp exchange including between a PTP application layer including the PTP clock, an interworking function to the dedicated timing channel, and to the dedicated timing channel. The method can be performed in a distributed, disaggregated network element.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for a tolerant Physical Coding Sublayer (PCS) for accurate timestamping in disaggregated network elements and synchronization. In an embodiment, the present disclosure includes a dedicated PCS channel for timing distribution, using techniques that prioritize accuracy, resolution, and resource utilization over bandwidth efficiency. This approach is low cost, high precision, and is compatible with existing hardware, using standard PTP over 25GE (or the like) to distribute timing in a distributed disaggregated network element. The allows the disaggregated chassis to distribute precisely phase aligned clocks throughout the system to ensure that all PTP/1588 enabled ports have similar performance. In another embodiment, the present disclosure includes a back-to-back interworking function (IWF) with standard PTP implementations, using a physical channel that is dedicated to highly accurate and efficient timing synchronization, rather than relying existing protocols, such as Ethernet, Optical Transport Network (OTN), Flexible Ethernet (FlexE), etc., which are not optimized for timing, and are expensive to implement.

Distributed, Disaggregated Network Element

Figure 1:
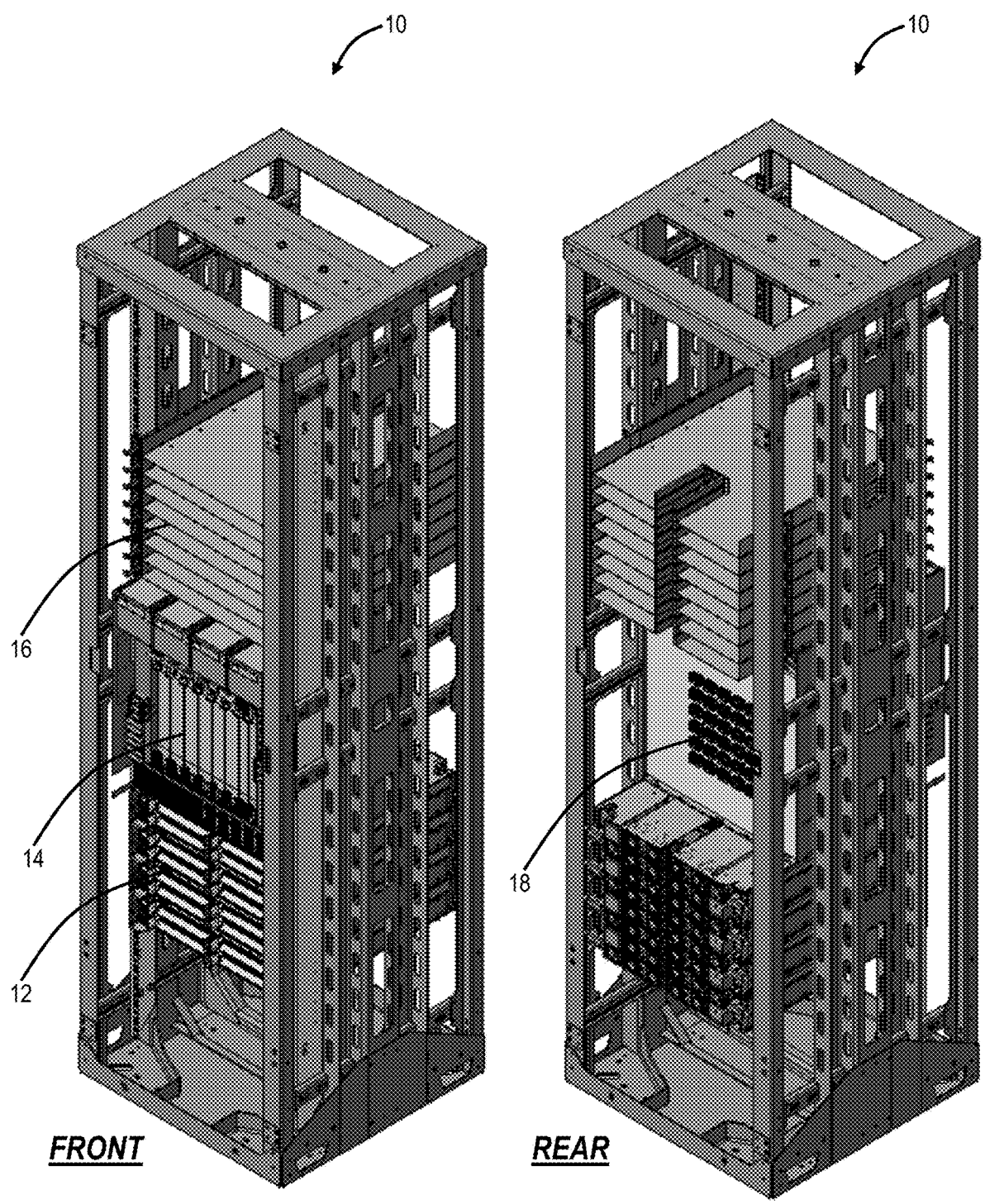
FIG. 1 is a diagram of an example distributed, disaggregated network element.

Again, FIG. 1 illustrates an example distributed, disaggregated network element 10. Variously, a distributed, disaggregated network element include multiple housings/chassis, but which behave as a single managed network element. The distributed, disaggregated network element requires a common timing reference to be very accurately synchronized among all the housings. As described herein, the housings can include the modules 12, the switch modules 14 that are in the chassis, other switch modules that are not in a chassis, etc. The housings can be connected using multi-channel high speed Direct Attach Cables or Active Optical Cables which are used to carry both synchronization signals and other management traffic (e.g., standard Ethernet PHYs). Thus, the requirement is to have a very accurate synchronization channel to operate at a standard PHY rate.

The present disclosure includes a dedicated channel, a PHY channel, for timing distribution and a synchronization process. These can be used with a distributed, disaggregated network element, but also can apply to any two modules or housings that are synchronized between one another.

Dedicated Channel for Timing Distribution

In an embodiment, the present disclosure provides high precision offered by the high baud rates of 25GE while maintaining the benefits of common and commodity 25 G hardware, but requires fewer resources by using a simplified, but error tolerant encoding. The encoding ensures that the process of encoding and decoding Ethernet frames has deterministic delay, and that the encoded and serialized word width are the same, both of which makes the process of timestamp correction trivial.

Specifically, the present disclosure includes dedicating a channel, such as a 25GE channel, for timing. The efficient encoding also ensures error-free operation by making a tradeoff of throughput for a substantial amount of redundancy within a codeword. If a dedicated link is used to carry only timing information, this tradeoff still allows more than sufficient bandwidth to carry all traffic necessary for a single PTP session.

From the perspective of interoperability with commodity 25GE mediums (ZSFP, QSFP28, QSFP-DD, DAC, AOC, etc), the only requirement is to utilize the nominal 25GE rate of 25.78125 Gbps. This ensures that any plugs containing CDRs (Clock and Data Recovery) will be able to recover a clock and bit-transparently retime the signal. Note, the present disclosure is described with reference to 25GE mediums for illustration purposes. Of course, other values are also contemplated. For example, a 400 G plug can include 16 channels of 25GE each, and the present disclosure contemplates operating 15 of these channels for data, and assigning one as a dedicated channel for timing, thereby having a data throughput of about 375 G. The dedicated high baud-rate physical timing channel has data thereon, but the data throughput is significantly reduced, e.g., on 25GE to about 1.5 G. The data on the dedicated timing channel is primarily PTP 1588 packets. The properties of how the data is encoded on the dedicated timing channel allows for accurate timestamps to be captured more easily than a standard encoding would. The rest of the lanes on the plug are carrying normal traffic at full rate. In this manner, commodity hardware can be used to interconnect housings.

The dedicated high baud-rate physical timing channel is optimized for the process of capturing of accurate timestamps by providing accurate and deterministic delay and high resolution. The proposed solution greatly simplifies the process of capturing accurate and high-resolution timestamps by using a much simpler encoding scheme that trades off effective throughput on the link (e.g., from 400GE to 375GE). The cost of implementation is lowered substantially, but the benefit of using a high baud rate is maintained. Of note, the reduced throughput is not an issue in the distributed, disaggregated network element.

The process of determining the receive and transmit delay of a transceiver is technology and vendor specific, with some technologies allowing for a deterministic or measured delay within 1UI (Unit Interval). In cases, where it is possible to determine transceiver delay within 1UI, the high data rate of 25GE provides the advantage that the accuracy of the correction is very high (1UI at 25 Gbaud is ~38 ps).

In addition, using a standard PHY baud allows the synchronization signal to be carried across the same cabling infrastructure (e.g., AOC cable) as other data traffic. This allows for simplified system interconnect in a distributed system.

Also, the present disclosure provides a dedicated "Time Marker" used to indicate a reference point for timestamps. Further, a simplified FEC encoding provides deterministic delay and a low cost of implementation at the expense of bandwidth inefficiency, which would otherwise be unsuitable if timing was not the primary concern.

Example Encoding Dedicated Channel for Timing Distribution

Figure 2:
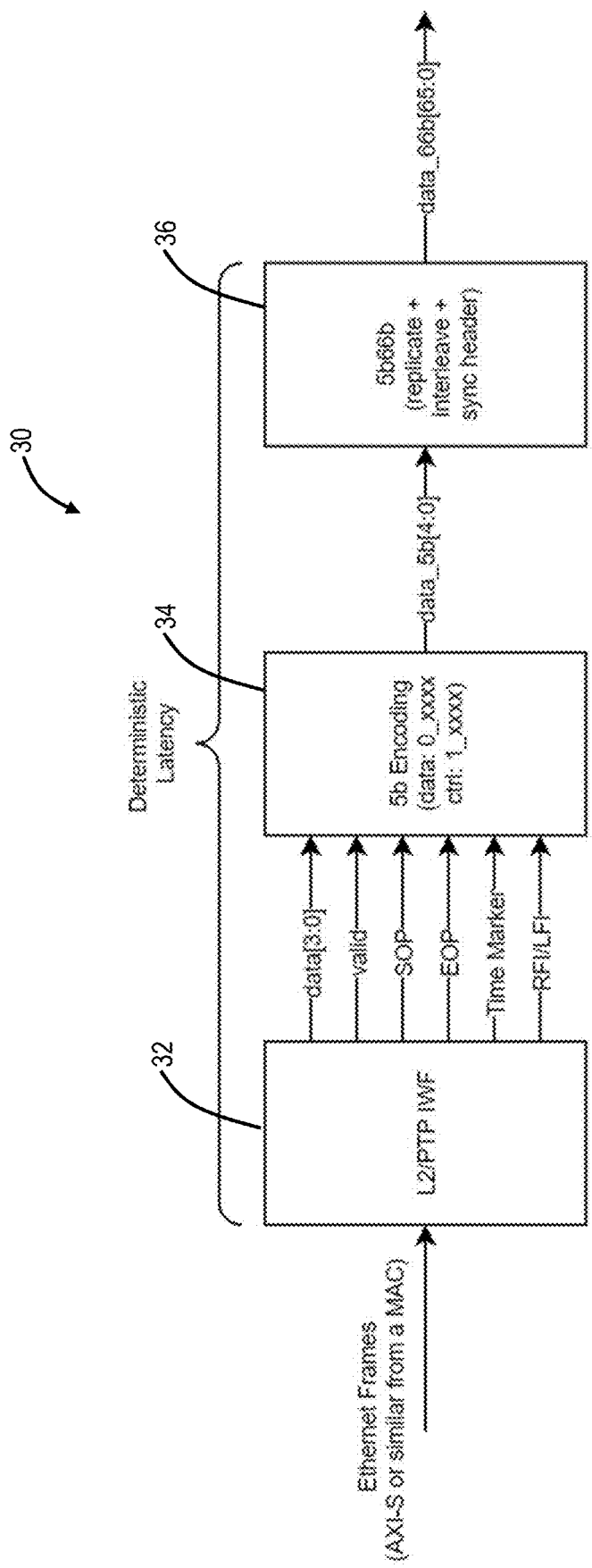
FIG. 2 is a block diagram of a circuit for implementing the dedicated PHY channel for timing distribution.

FIG. 2 is a block diagram of a circuit 30 for implementing the dedicated PHY channel for timing distribution. The circuit 30 can be on a host device or module or housing that supports a pluggable module or interfaces to a cable. Those skilled in the art will recognize the following implementation is presented for illustration purposes and other approaches consistent with dedicating a PHY channel for timing are also contemplated. Specifically Since many transceivers have features specific to common 64b/66b encoding schemes, an encoding based around a 66-bit data word can be used. The encoding can define a set 5-bit codes to encode control and data characters. Packet data is sent 4-bits at a time using 16-datawords, which are encoded as 0b0_xxxx. A set of control words, encoded as 0b1_xxxx can be chosen as well. Control words are used for the following:

---
Frame delineation (SOP/EOP)
Inter-packet gap (IDLEs)
Remote Fault Indication (RFI)
Local Fault Indication (LFI)
Timestamp Marker

---

Once a data stream is encoded as a series of 5-bit codes, these 5-bit codes are then transcoded to become 66-bit data words. (i.e., 5b66b encoding). The 5-bit code can be simply replicated 6-times and concatenated to create a 30-bit word. The 30-bit word is inverted and interleaved with the non-inverted word to create a 60-bit word.

This process of inverting and interleaving ensures perfect DC balance on the connected link without the need for a scrambler (as used in 6466b) or logic to track the running disparity (as in 8b10b). The remaining 6-bits are used to create a sync pattern to allow the downstream link to find and align to the block boundary.

On receive, the block alignment process re-uses the standard block alignment procedure use for 64b/66b encoding, the only difference being that a 6-bit sync header is used in place of the 2-bit sync header.

The circuit 30 includes a Layer 2 (L2)/PTP Interworking Function (IWF) 32, an encoding block 34, and a replicator, interleave, and sync header block 36. From left to right, the IWF 32 is configured to receive Ethernet frames and provide data, a valid indicator, Start of Packet (SOP), End of Packet (EOP), Time Marker, and Local Fault Indication (LFI)/Remote Fault Indication (RFI), to the encoding block 34. The encoding block 34 performs 5b encoding as described above.

The replicator, interleave, and sync header block 36 replicates the 5b code word, interleaves it to double the size, and adds a sync header.

Again, the foregoing is presented for illustration purposes and other approaches are contemplated. Of note, this 5b66b can reduce the data rate from 25 G to around 1.5 G, in the 25GE example. However, this encoding is very accurate for conveying time stamps and the data rate is enough to support PTP messages. Other reduce rate embodiments are contemplated and 5b66b is merely presented for illustration purposes.

The PCS encoding scheme includes a dedicated character (denoted as "Time Marker" herein and in FIG. 2) to indicate to the transmit and receive logic that a timestamp should be captured. Precise timestamps are fed back to the IWF 32 that transparently connects a standard Ethernet based PTP clock to this dedicated proprietary timing channel. The precise timestamps are used by the IWF 32 to make precise corrections to the original timestamps provided by the PTP clock.

Dedicated Channel for Timing Distribution

Figure 3:
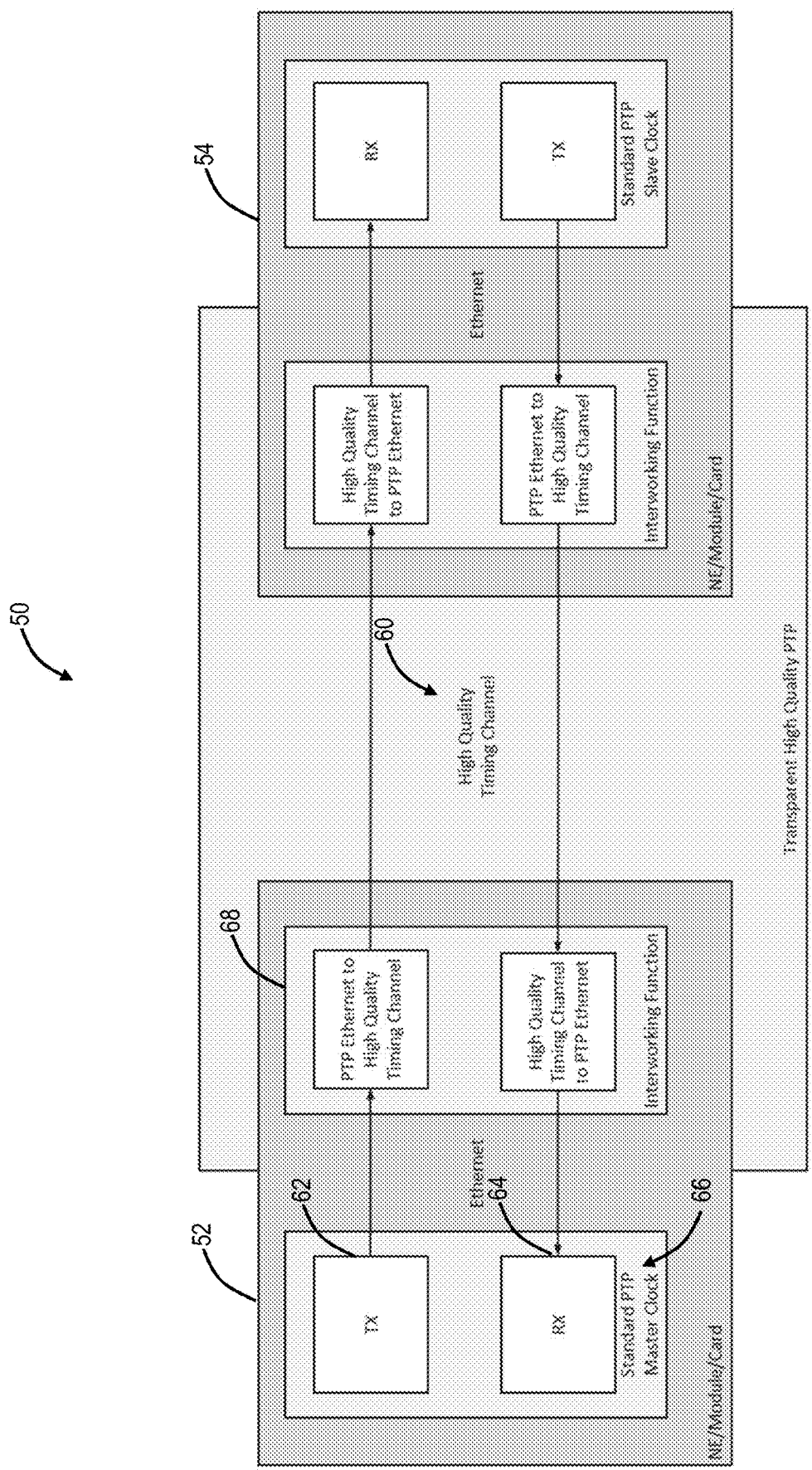
FIG. 3 is a block diagram of a system that includes two devices that are configured to perform transparent, high-quality synchronization between one another via a dedicated timing channel.

FIG. 3 is a block diagram of a system 50 that includes two devices 52, 54 that are configured to perform transparent, high-quality synchronization between one another via a dedicated timing channel 60. In an embodiment, the dedicated timing channel 60 can be the dedicated PHY channel described above, although other embodiments are contemplated. Also, the system 50 can include the distributed, disaggregated network element 10, although other embodiments are contemplated.

The two devices 52, 54 can be a network element, a module, a card, etc. For example, in a network environment, the two devices 52, 54 can each be a separate network element. In the distributed, disaggregated network element 10 example, the two devices 52, 54 can each be a module, card, housing, etc. Each device 52, 54 includes circuitry that includes a transmitter 62, a receiver 64, a PTP clock 66, and an IWF 68.

The PTP clock 66 at the device 52 can be a master clock and the PTP clock 66 at the device 54 can be a slave clock. The present disclosure includes an approach to allow PTP 1588 master and slave clocks to synchronize the devices 52, 54 (NEs/chassis/modules) with high accuracy and precision using the dedicated timing channel 60.

The devices 52, 54 have back-to-back IWF 68 that transparently provide standard master and slave PTP clocks operating within each housing with enhanced timestamping quality using a highly accurate, precise and high-rate dedicated timing channel. Typically, 1588 PTP timing is synchronized over Ethernet or other communication channels which are designed primarily for efficient transport and high bandwidth rather than channels designed to be optimized for efficient and very accurate timing synchronization.

The Master and Slave clocks use standard PTP 1588 Software and Protocol Stack and standard gigabit Ethernet hardware. The interworking function 68 mimics an Ethernet PHY with 1588 timestamping functionality but uses the dedicated timing channel 60 between the PTP clocks 66 rather than Ethernet. The IWF 68 detects 1588 event messages and modifies certain timing fields using timestamps and timing markers associated with the accurate timing channel 60. Event messages enter and exit the channel without regard to timing synchronization on the channel and may be treated as would non-event messages traversing the channel—however their timestamps are adjusted to reflect highly accurate timestamps from the timing channel.

Synchronization between devices

Figure 4:
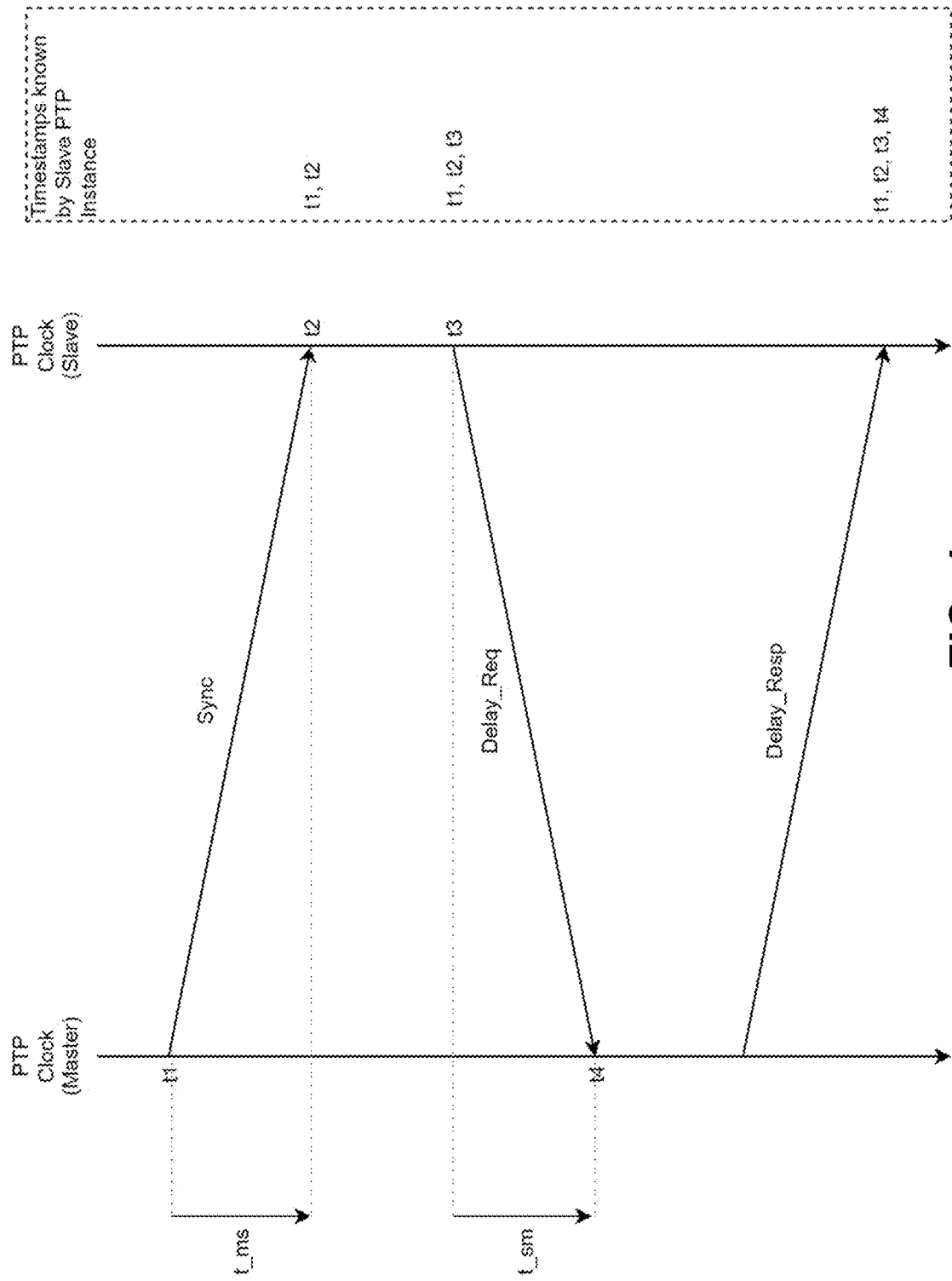
FIG. 4 is a diagram between the PTP master clock and the PTP slave clock for timestamp exchange as specified in the PTP standard.

FIG. 4 is a diagram between the PTP master clock and the PTP slave clock for timestamp exchange as specified in the PTP standard. FIG. 4 assumes a one-step timestamping procedure is used as opposed to a two-step. At t1, the device 52 sends a sync request to the device 54 which receives it at t2. At t3, the device 54 sends a delay request to the device 52 which receives it at t4, and the device 52 sends a delay response to the device 54 which now has known timestamps t1, t2, t3, t4. FIG. 4 shows the ideal view of the timestamp exchange from a PTP application point of view.

Figure 5:
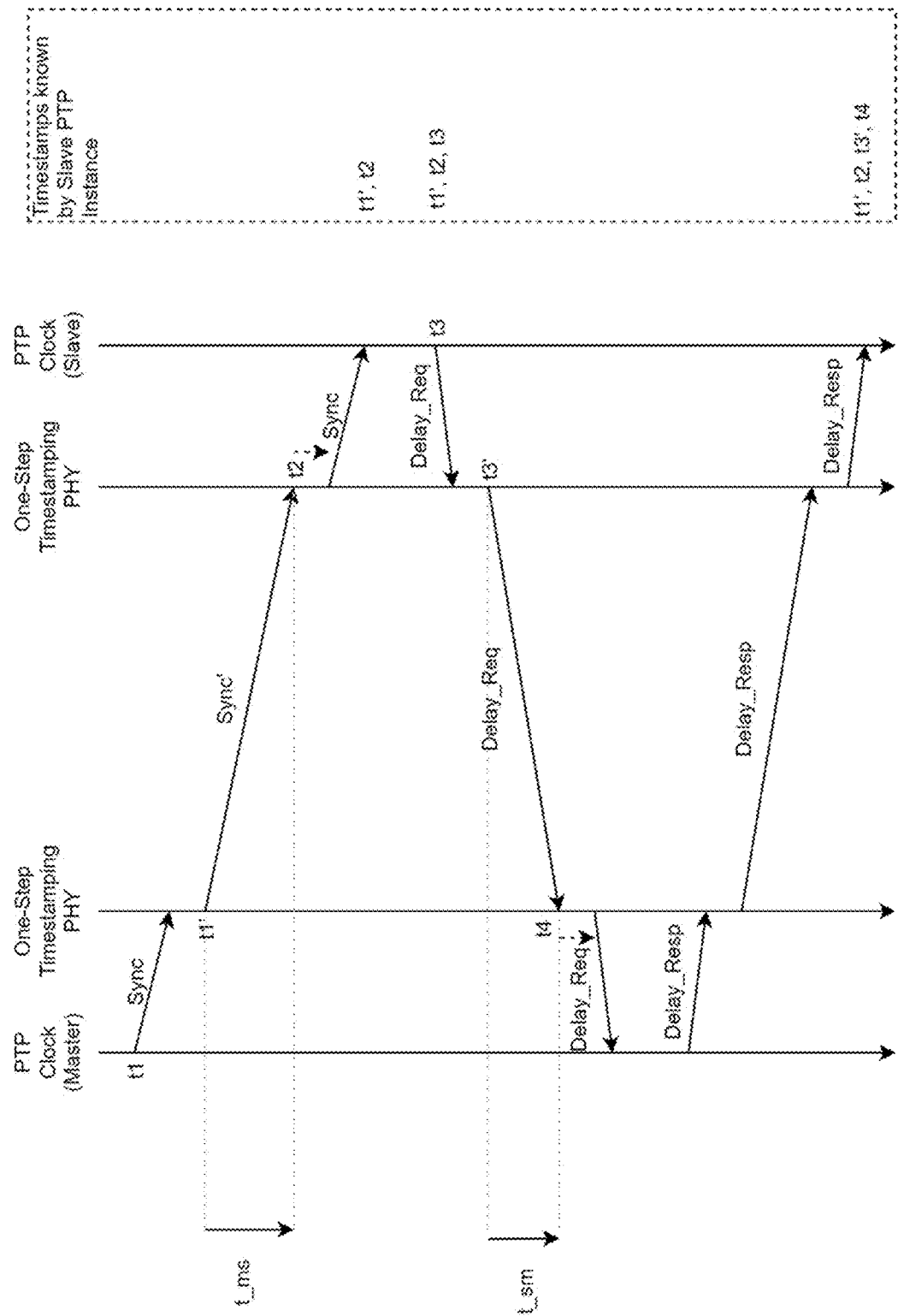
FIG. 5 is a diagram between the PTP master clock and the PTP slave clock for timestamp exchange with the application and physical shown separately.

In a typical implementation, the application and physical layer of often removed from one another within a system. FIG. 5 is a diagram between the PTP master clock and the PTP slave clock for timestamp exchange with the application and physical shown separately. Here, the application is indicated by the PTP master clock and the PTP slave clock, and the physical layer is indicated by a one-step timestamping PHY.

At time t1, the PTP master clock sends a sync request to the timestamping PHY which receives it at t1' and sends a sync' to the timestamping PHY at the device 54 which receives it at t2 and provides this to its PTP slave clock, which now has timestamps t1', t2. At time t3, the PTP slave clock sends a delay request to its timestamping PHY which sends out the delay request at time t3'. At time t4, the timestamping PHY at the device 52 receives the delay request which provides it to the PTP master clock. The device 52 responds with a delay response to the device 54 which then has the timestamps t1', t2, t3', t4.

FIG. 5 shows the PTP clock and timestamping process separately. Typically, t1 and t3 are first captured by the application layer, and later corrected to be more precise in the timestamping PHY. The techniques used to correct the timestamp in the packet (differences between t1, t1' and t3, t3') and relay the corrected timestamps back to the application layer are implementation specific, and not specified in the PTP standard. A typical implementation is to communicate the corrected t3 via the correction field of Delay_Resp.

Synchronization Between Devices Using an Interworking Function

Figure 6:
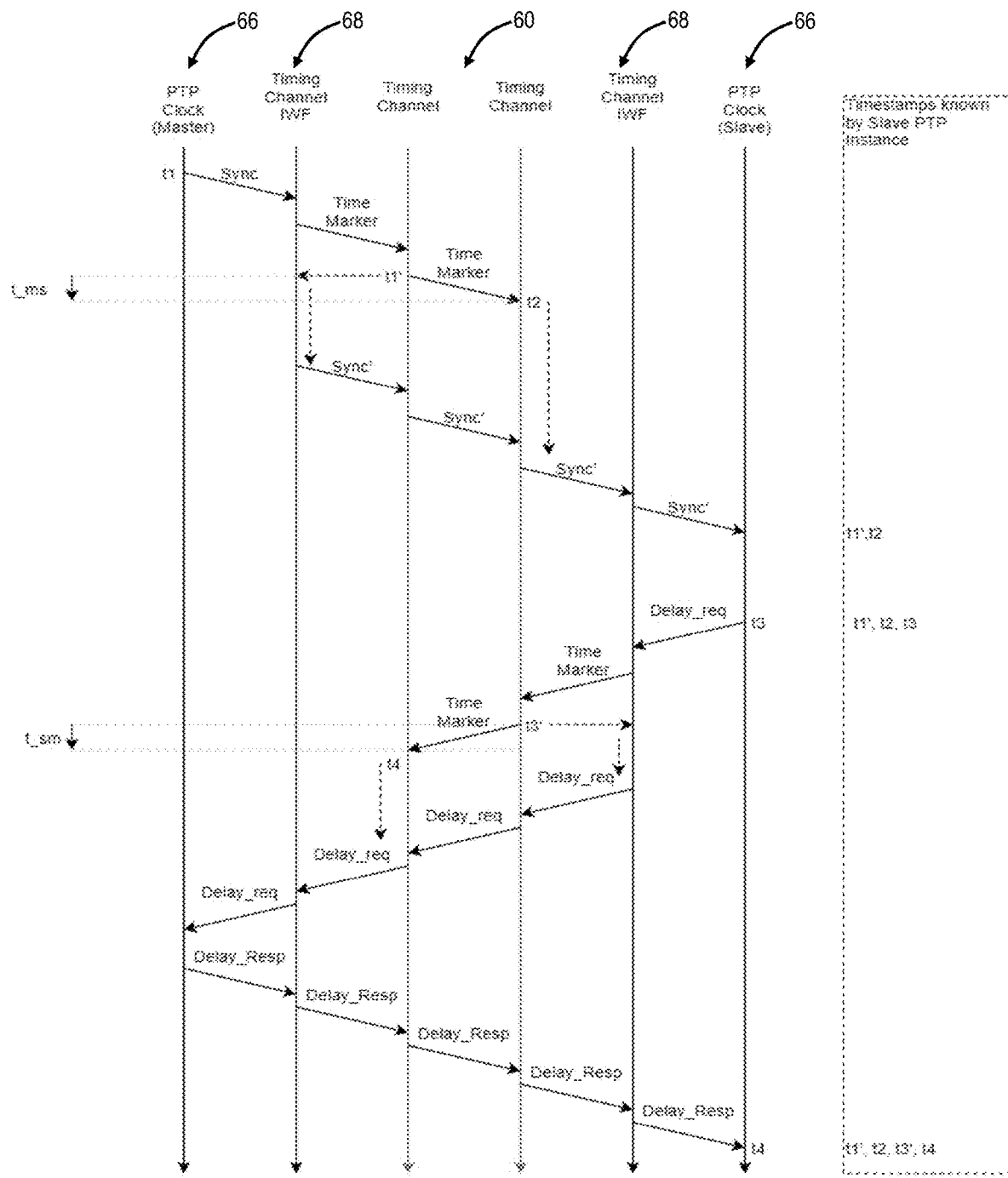
FIG. 6 is a diagram between the PTP master clock and the PTP slave clock for timestamp exchange with the timestamp exchange in three layers, the PTP application layer, the IWF to the dedicated timing channel, and the dedicated timing channel.

FIG. 6 is a diagram between the PTP master clock and the PTP slave clock for timestamp exchange with the timestamp exchange in three layers, the PTP application layer, the IWF to the dedicated timing channel, and the dedicated timing channel. Note, in FIG. 6, the communication between the outer two layers (the PTP clocks 66 and IWF 68) in isolation is the same as in FIG. 5. The IWF 68 communicates with the dedicated timing channel 60 to capture precise timestamps, and uses the precise timestamps to correct the timestamps inserted by the PTP application layer. The "Time Marker" transmission and reception becomes the new reference point for t_ms (time master-slave, t2-t1) and t_sm (time slave-master, t4-t3). This decouples the timestamp capture from the sending and receiving the event messages on the physical link, which allows the event message timestamps to be edited asynchronously instead of on the fly.

The following describes the details of the operations in FIG. 6. For sync messages from the device 52 with the PTP master clock 66 to the device 54 with the PTP slave clock 66, for timestamps t1, t2. The Master IWF receives a Sync event message from the PTP Master Clock to be sent to the PTP Slave Clock and holds it locally in a buffer. The Master IWF sends a time marker code to the Slave, and notes the time t1 at which it was sent. The Slave IWF receives the time marker code, and notes the time t2 at which it was received (this step may occur before or after the next step which is done shortly after the previous step). The originTimestamp (or correctionField) field of the Master IWF's buffered Sync event message is updated with t1. The Master IWF sends the modified Sync message to the Slave (this mimics a 1-step PHY timestamping operation). The Slave IWF receives the modified Sync message (which contains t1) and sends it to the PTP Slave Clock stack along with t2, mimicking the operation of a timestamping PHY (note that t2 capture time header/footer fields are not defined by the PTP standard).

By using an independent time marker to more precisely capture t1 at the master and t2 at the slave, timestamp capture is decoupled from the transmission of the packet. Logically, this process works similar to a two-step timestamp implementation, but from the perspective of the 1588 stack it appears to function as a one-step since the stack does not have to send a Follow_Up to send t1 to the slave.

For delay request messages from the PTP slave clock 66 to the PTP master clock 68, for timestamps t3, t4. The Slave IWF receives a Delay_Req message from the PTP Slave Clock to be sent to the Master and holds it locally in a buffer. The Slave IWF sends a time marker code to the Master and notes the time t3 at which it was sent. The time t3 is sent back to the PTP Slave Clock servo (note that t3 notification messages required for Slave delay calculations from a timestamping Phy are not defined by the PTP standard). Alternatively, the Slave IWF used the time t3 to adjust the correctionField field of the Delay_Req message. The Master IWF receives the time marker code, and notes the time t4 at which it was received. The Slave IWF sends the buffered Delay_Req to the master (in this example the Master does not really care about t3—however updating the originTimestamp with t3 mimics a one-step timestamping PHY). The master IWF forwards the received Delay_Req message to the PTP Master Clock along with the t4 captured from the time marker to be used as 'receiveTimestamp' in subsequent Delay_Resp from PTP Master Clock. In addition, the correctionField of the Delay_Req is added to the correctionField of the Delay_Resp.

For the Master to Slave Delay_Resp message, no message adjustments are taken by any IWF and the message is simply forwarded transparently from the PTP Master Clock to the PTP Slave Clock. Delay_Resp is not an event message. t4 was determined by the PTP Master Clock from the previously received Delay_Req, and this t4 is already embedded in the Delay_Resp message as the 'receiveTimestamp'0 field.

All other 1588 messages are forwarded transparently by the IWF. The only rule that must be adhered to is that when a time marker code corresponding to a Sync or Delay_Req message is sent, the next packet sent must be the message associated with the time code. Event message packet ordering is always maintained across the channel. By consequence if multiple PTP Master or Slave clocks are using the channel then packet ordering is maintained within each PTP session. In practice the event messages will see minimal delay as timing markers can be sent on the timing channel on demand.

The back-to-back IWF can work with standard PTP Clock implementations, and can use a physical channel that is dedicated to highly accurate and efficient timing synchronization, rather than relying existing protocols, such as ethernet, OTN or FlexE, which are not optimized for timing, and are expensive to implement.

The main principle is the use of a physical channel that is dedicated to timing synchronization. The channel uses a simplified error tolerant encoding that allows for deterministic delay between encoded data, and the physical pin of the device. Unlike Ethernet where the definition and specific implementation of the physical layer can reduce the potential accuracy of timestamps, the definition of the physical layer is optimized for timestamp accuracy.

A dedicated "time marker" is specified to decouple the timestamp reference point from the start of the PTP event message to simplify the process of producing and communicating accurate timestamps.

An interworking function is defined to allow a standard PTP implementation to communicate via the dedicated timing channel transparently. The IWF improves the accuracy of the timestamps communicated in PTP packets without the knowledge or intervention of the attached PTP application layer.

Process

Figure 7:
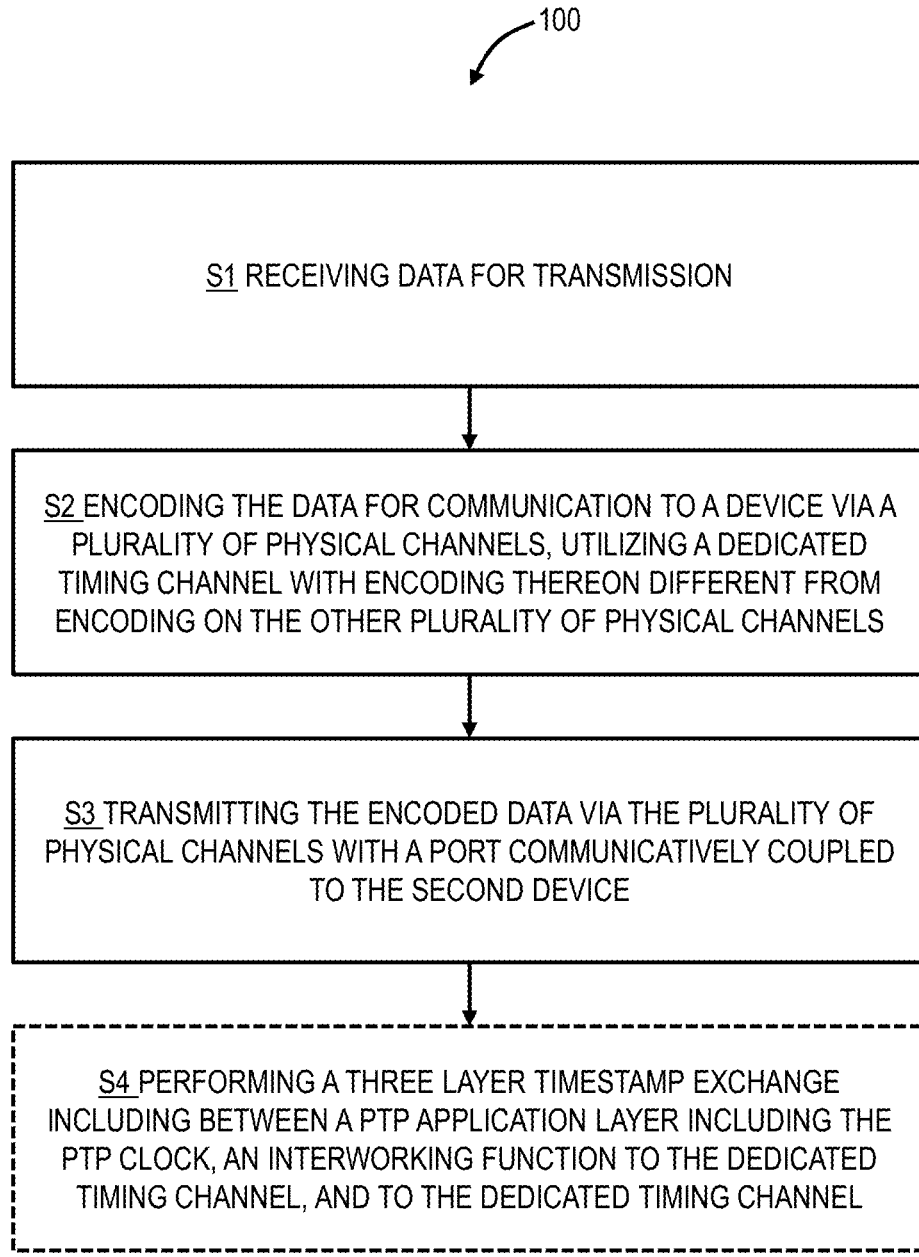
FIG. 7 is a flowchart of a process for implementing a dedicated timing channel.

FIG. 7 is a flowchart of a process 100 for implementing a dedicated timing channel. The process 100 contemplates implementation as a method, via circuitry, via a module, via a network element, etc. The process 100 includes receiving data for transmission (step S1); encoding the data for communication to a device via a plurality of physical channels, utilizing a dedicated timing channel with encoding thereon different from encoding on the other plurality of physical channels (step S2); and transmitting the encoded data via the plurality of physical channels with a port communicatively coupled to the second device (step S3).

The plurality of physical channels can be Ethernet Physical channels. The encoding on the dedicated timing channel can include encoding the data as a series of codes, replicating and interleaving the series of codes, and adding a header. The process 100 can further include performing a three layer timestamp exchange including between a PTP application layer including the PTP clock, an interworking function to the dedicated timing channel, and to the dedicated timing channel (step S4). The method can be performed in a distributed, disaggregated network element.

Network Element

In another embodiment, a network element includes a port; and a device comprising circuitry configured to encode data for communication to a second device via a plurality of physical channels, and utilize a dedicated timing channel with encoding thereon different from encoding on the other plurality of physical channels, and interface encoded data via the plurality of physical channels with the port for transmission and reception with the second device. The plurality of physical channels can be Ethernet Physical channels. The encoding on the dedicated timing channel has a significantly lower throughput than the encoding on the other plurality of physical channels.

The encoding on the dedicated timing channel can include encoding the data as a series of codes, replicating and interleaving the series of codes, and adding a header. The circuitry can be further configured to add timestamps to the encoded data on the dedicated timing channel. The network element can be a distributed, disaggregated network element, and the device and the second device are both included therein. The port can be on a pluggable optical module. The data on the dedicated timing channel can include Precision Time Protocol (PTP) messages.

In a further embodiment, an interworking circuit includes a connection to a first Precision Time Protocol (PTP) clock; a connection to a second interworking circuit having a second PTP clock via a dedicated timing channel; and circuitry configured to perform a three layer timestamp exchange including between a PTP application layer including the PTP clock, an interworking function to the dedicated timing channel, and to the dedicated timing channel. The interworking function is configured to use precise timestamps with the dedicated timing channel and to correct timestamps at the PTP application layer with the precise timestamps.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A network element comprising:
   a port including a transmitter and a receiver; and
   a device comprising circuitry configured to
      encode data for communication to a second device via a plurality of physical channels,
      utilize one of the plurality of physical channels as a dedicated timing channel, to the second device for synchronization therebetween, wherein the dedicated timing channel includes encoding thereon different from encoding on the other plurality of physical channels,
      interface encoded data via the plurality of physical channels with the port for transmission and reception with the second device, and
      perform a three layer timestamp exchange including between a PTP application layer including a Precision Time Protocol (PTP) clock, an interworking function to the dedication timing channel, and the dedicated timing channel.

2. The network element of claim 1, wherein the plurality of physical channels are Ethernet Physical channels.

3. The network element of claim 1, wherein the encoding on the dedicated timing channel has a significantly lower throughput than the encoding on the other plurality of physical channels.

4. The network element of claim 1, wherein the encoding on the dedicated timing channel includes encoding the data as a series of codes, replicating and interleaving the series of codes, and adding a header.

5. The network element of claim 1, wherein the circuitry is further configured to
   add timestamps to the encoded data on the dedicated timing channel.

6. The network element of claim 1, wherein the network element is a distributed, disaggregated network element, and the device and the second device are both included therein.

7. The network element of claim 1, wherein the port is on a pluggable optical module.

8. The network element of claim 1, wherein the data on the dedicated timing channel includes PTP messages.

9. A method comprising:
   receiving data for transmission;
   encoding the data for communication to a device via a plurality of physical channels;
   utilizing one of the plurality of physical channels as a dedicated timing channel, to the device for synchronization, wherein the dedicated timing channel includes encoding thereon different from encoding on the other plurality of physical channels;
   transmitting the encoded data via the plurality of physical channels through a port communicatively coupled to the second device, the port including a transmitter and a receiver; and
   performing a three layer timestamp exchange including between a Precision Timer Protocol (PTP) application layer including a PTP clock, an interworking function to the dedication timing channel, and the dedicated timing channel.

10. The method of claim 9, wherein the plurality of physical channels are Ethernet Physical channels.

11. The method of claim 9, wherein the encoding on the dedicated timing channel includes encoding the data as a series of codes, replicating and interleaving the series of codes, and adding a header.

12. The method of claim 9, wherein the method is performed in a distributed, disaggregated network element.

13. The method of claim 9, wherein the encoding on the dedicated timing channel has a significantly lower throughput than the encoding on the other plurality of physical channels.

14. The method of claim 9, further comprising adding timestamps to the encoded data on the dedicated timing channel.

15. The method of claim 9, wherein the port is on a pluggable optical module.

\* \* \* \* \*